United States Patent [19]

Martin

[11] Patent Number: 5,027,494

[45] Date of Patent: Jul. 2, 1991

[54] METHOD OF ADJUSTABLY APPLYING TENSION TO A GARAGE DOOR

[75] Inventor: David O. Martin, Salt Lake City, Utah

[73] Assignee: Martin Door Manufacturing, Inc., Salt Lake City, Utah

[21] Appl. No.: 514,237

[22] Filed: Apr. 25, 1990

Related U.S. Application Data

[62] Division of Ser. No. 361,553, Jun. 5, 1989, Pat. No. 4,934,439.

[51] Int. Cl.[5] .............................................. B23P 6/00

[52] U.S. Cl. ............................ 29/402.15; 29/402.17; 29/446; 29/452; 52/291; 248/300; 248/558; 403/21

[58] Field of Search .................... 29/446, 452, 402.14, 29/402.15, 402.17; 52/71, 291, 514, 640, 710, 721; 49/501; 160/199, 201, 206, 207, 210, 213; 248/300, 558; 403/205, 403, 382, 21

[56] References Cited

U.S. PATENT DOCUMENTS

| | | | |
|---|---|---|---|
| 2,027,831 | 1/1936 | Kunz | 52/291 |
| 2,175,688 | 10/1939 | Ferris | 52/291 X |
| 4,513,554 | 4/1985 | Johnson et al. | 403/205 X |
| 4,589,792 | 5/1986 | Niziol | 403/403 X |
| 4,949,929 | 8/1990 | Kesselman et al. | 248/300 |

*Primary Examiner*—Joseph M. Gorski
*Assistant Examiner*—Peter D. Vo
*Attorney, Agent, or Firm*—J. Winslow Young

[57] ABSTRACT

The present invention relates to a novel strut and bracket apparatus for mounting to a section of an overhead garage door, the strut and bracket combination being utilized to selectively impart the desired tensile forces to the section, thereby correcting or repairing or otherwise compensating for any misalignment or tendency for misalignment in the section. Specially shaped brackets are used along with hardened steel bolts to assure secure and safe attachment of the strut to the bracket.

3 Claims, 2 Drawing Sheets

METHOD OF ADJUSTABLY APPLYING TENSION TO A GARAGE DOOR

RELATED APPLICATIONS

This application is a divisional application of my copending patent application Ser. No. 361,553 filed June 5, 1989 for TENSION STRUT APPARATUS AND METHOD FOR AN OVERHEAD GARAGE DOOR now U.S. Pat. No. 4,934,439.

BACKGROUND

1. Field of the Invention

This invention relates to overhead garage doors and, more particularly, to a tension strut apparatus and method for stiffening or otherwise supporting and also selectively applying tension to the sections of an overhead garage door thereby correcting or creating a predetermined degree of curvature in the section.

2. The Prior Art

Overhead garage doors are well-known and are used as closures for large openings such as garage and warehouse entrances. The overhead garage door is configured as a plurality of horizontally oriented, elongated sections hingedly joined along adjacent edges to form the vertical door. The ends of the sections are movably mounted in vertical tracks at each edge of the large opening. The upper ends of the tracks curve interiorly to a horizontal position so that when the overhead garage door is opened, it is raised vertically into an elevated, horizontal position inside the enclosure. In this manner, the overhead garage door is suspended overhead and out of the way when it is open to its fullest extent, thereby leaving a relatively unobstructed entrance to the garage, warehouse, or the like.

From the foregoing, it is clear than an overhead garage door of any significant size will be quite heavy to lift vertically from its closed position to the horizontal, open position. Accordingly, it is customary to mount torsion spring apparatus, electrically operated door openers, and the like, to assist the operator in raising and lowering the overhead garage door between the closed and opened positions.

Due to the length of the sections in the overhead garage door, there is a tendency for the sections to sag downwardly when the overhead garage door is raised to the open or elevated position. Furthermore, wind loading is an important consideration when the overhead garage door is in the closed or vertical position. It is, therefore, customary to mount longitudinal struts on the back side of each overhead garage door section in order to impart the necessary rigidity to the section. The conventional strut is generally fabricated from sheet metal and is formed into a U-shaped configuration in cross section with an integral flange at the end of each arm of the U-shape. The flanges have holes therein to permit the strut to be bolted directly to the back of the section.

However, many factors cause the section of an overhead garage door to be curved out of alignment. For example, overhead garage door sections fabricated from wood will warp from such causes as exposure to moisture, grain direction in the wood, different wood types in the various parts of the section. Additionally, the weight of the section itself and the wind loading to which the total overhead garage door is exposed will cause it to be distorted out of alignment. This distortion can either be concave or convex relative to the exterior or visually exposed portion of the overhead garage door when in the closed position.

Until the advent of the present invention, there has been no satisfactory apparatus or method for compensating for these factors which cause the section to be curved out of alignment. It would, therefore, be an advancement in the art to provide a novel apparatus and method for applying a corrective tensile force to a section of an overhead garage door. Such an apparatus and method is disclosed and claimed herein.

BRIEF SUMMARY AND OBJECTS OF THE INVENTION

This invention relates to a novel tension strut apparatus and method for supporting, stiffening, or applying a corrective tensile force to a section of an overhead garage door. The linear strut is fabricated from a sheet metal and is configured with a generally C-shaped cross section. The specifications and material of construction are selectively predetermined so as to impart a desirable degree of lateral stiffness to the strut along the axis of the upright portion of the C-shape. Mounting brackets are provided and are fabricated from sheet metal with a generally L-shaped configuration. The exposed edges of the brackets have rounded edges for safety reasons. The brackets are mounted to the section at preselected locations along the length of the section. The strut is adjustably secured to the brackets. The relative distance between the strut and the section is selectively predetermined at each bracket in order to impart a predetermined degree of tension to the section by the strut. Importantly, hardened bolts are used to secure the strut to the brackets so as to be able to withstand the forces encountered.

It is, therefore, a primary object of this invention to provide improvements in a strut system for an overhead garage door.

Another object of this invention is to provide improvements in the method for mounting a strut to a section of an overhead garage door.

Another object of this invention is to provide improvements in the method for imparting a tension to a second of an overhead garage door in order to correct a misalignment of the section of the overhead garage door.

Another object of this invention is to provide a novel strut for a section of an overhead garage door, the strut being used to impart tension to the section.

Another object of this invention is to provide a novel strut and bracket system for operatingly imparting a desired degree of tension to the section in order to correct a misalignment of the section.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENTS

Figure 1:
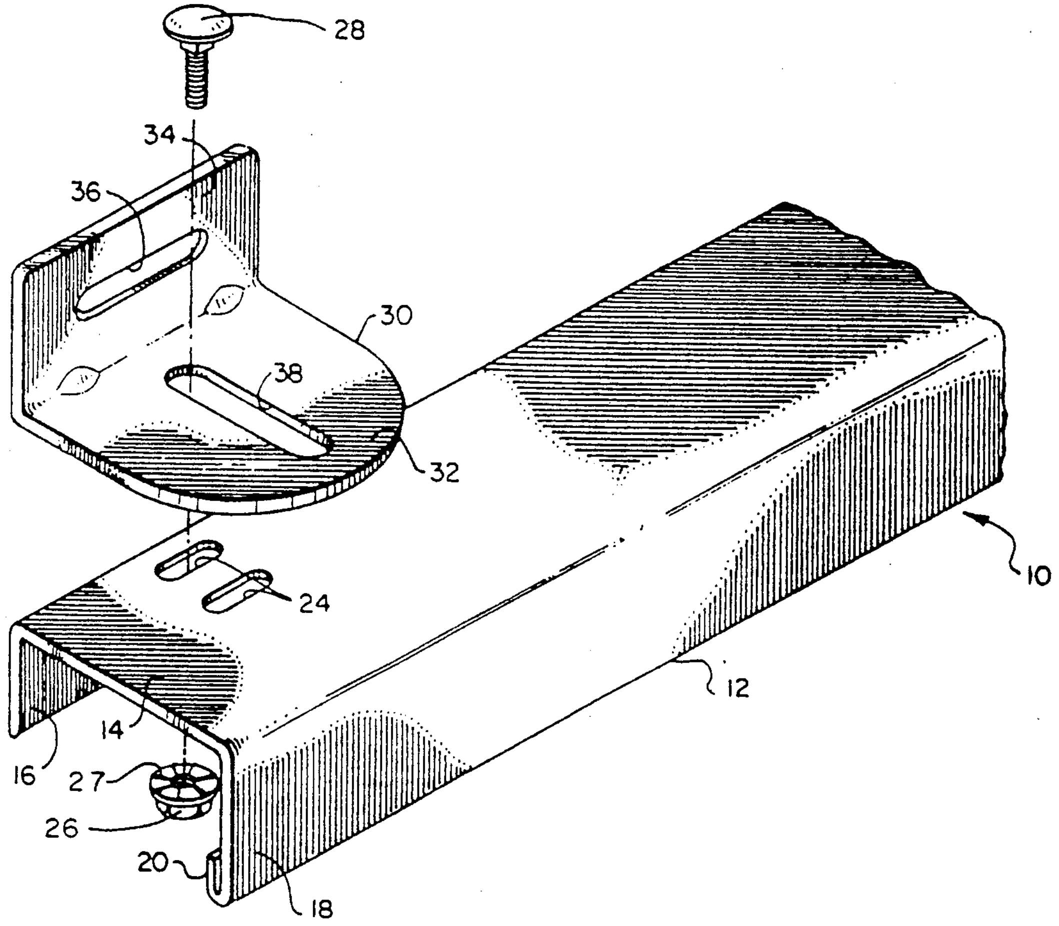
FIG. 1 is an enlarged, exploded, fragmentary perspective view of a first preferred embodiment of the novel strut and bracket apparatus of this invention.

The invention is best understood by reference to the drawing wherein like parts are designated by like numerals throughout in conjunction with the following description.

General Discussion

It is well known throughout the construction industry that precision in dimensional accuracy is the exception rather than the rule. Construction workers endeavor to achieve a reasonable degree of accuracy but it is acknowledged throughout the industry that skilled workers are necessary for the purpose of compensating for minor deviations in the conformity of the construction plans. Further, construction materials such as wood vary slightly in external dimensions from one mill to the next. Wood also is notorious for its tendency to shrink, swell or warp under changing moisture conditions.

The end result of the foregoing is that an opening that is to be fitted with an overhead garage door will have certain deviations from the proper dimensional accuracy called for in the plans. For example, a slight curvature in the beam or header that forms the upper portion of the opening can adversely affect the proper closure of an overhead garage door installed in the opening. One particular problem arises when there is a slight lateral curvature in this beam so that the upper section of the overhead garage door can not properly conform to the opening when the overhead garage door is closed. Poorly fitted overhead garage doors leave gaps that are unsightly so that there is a tendency for the installer to reduce the gap by mounting the overhead garage door more tightly in the opening. The result is that one or more portions of the section of the overhead garage door will rub against the beam. This rubbing action scrapes the paint and leaves an unsightly, marred surface on the section.

Detailed Description

Referring now more particularly to FIGS. 1, the novel strut and bracket apparatus of this invention is shown generally at 10 and includes a strut 12 and a bracket 30. Strut 12 is configured as an elongated, relatively thin walled channel beam fabricated from sheet metal with a generally C-shaped cross section. The C-shape of strut 12 is formed with a web 14 having two side elements 16 and 18 extending perpendicularly therefrom to form the inverted channel beam shown in FIG. 1. The specifications and materials of construction of strut 12 are selectively predetermined so as to impart the desired degree of lateral stiffness to web 14 in cooperation with side elements 16 and 18. The edge of side element 18 is formed into a single hem 20 thereby concealing any sharp edges which would otherwise be exposed to the operator (not shown). Side element 16 is configured to be placed adjacent an overhead door section 40 (FIGS. 2 and 3) while side element 18 is supported outwardly away from and parallel to section 40.

A plurality of elongated holes such as hole 24 are punched through web 14 to receive therethrough the shank of a bolt 28 when strut 12 is mounted to bracket 30 as will be described more fully hereinafter. Hole 24 is elongated to provide a limited degree of adjustment between strut 12 and bracket 30 since the longitudinal axis of hole 24 is transverse to the longitudinal axis of slot 38 in leg 32.

Figure 2:
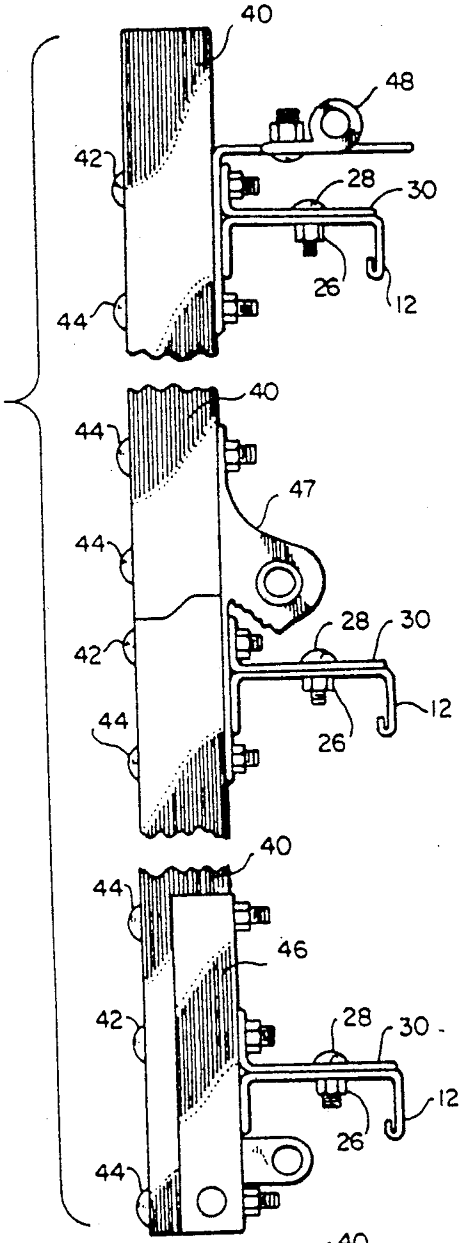
FIG. 2 is a schematic illustration of the novel bracket and strut apparatus of this invention mounted to an overhead garage door and shown as an end view with portions broken away to reveal hidden components.
Figure 3:
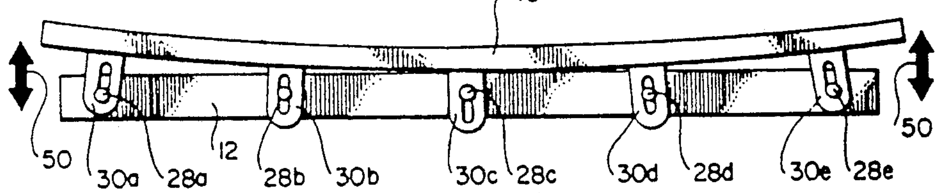
FIG. 3 is a plan view of the novel strut and bracket apparatus of this invention mounted to a section of an overhead garage door illustrating the method for imparting the desired degree of tension to the section to compensate for an exaggerated concave curvature of the section.
Figure 4:
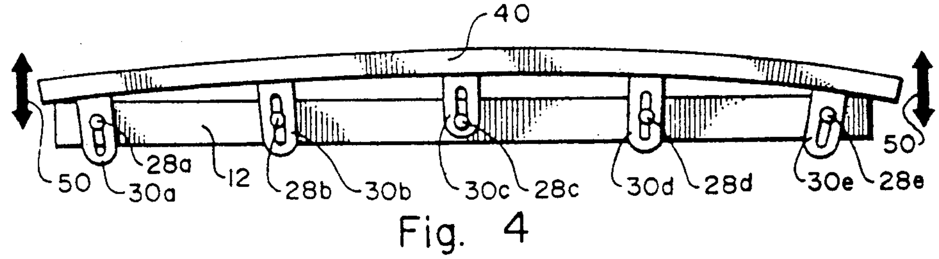
FIG. 4 is a plan view of the novel strut and bracket apparatus of this invention mounted to a section of an overhead garage door illustrating the method for imparting the desired degree of tension to the section to compensate for an exaggerated convex curvature of the section.

Bracket 30 is fabricated from sheet metal and includes the desired specifications of length, width, and thickness dimensions so as to provide the necessary structural rigidity to support strut 12 relative to section 40 (FIGS. 2 and 3). Bracket 30 is formed with an L-shaped configuration having an upright section or leg 32 and a foot 34. The end of leg 32 is rounded as shown to eliminate any exposed corners for purposes of safety. Foot 34 is formed at a right angle to leg 32 and is adapted to be mounted to door section 40 (FIGS. 2 and 3) while leg 32 is configured to selectively support strut 12. A slot 36 in foot 34 is formed as an elongated slot along a portion of the axis of foot 34. Slot 36 permits lateral adjustment of bracket 30 to section 40. An elongated slot 36 is formed in leg 32 to permit adjustment of strut 12 relative to door section 40 (FIGS. 3 and 4). Bolt 28 passes through slot 38 and hole 24 and is secured thereto by a nut 26. Importantly, bolt 28 is fabricated from a hardened steel so as to provide the necessary strength to bolt 28. For convenience in operation and secure engagement of strut 12 to bracket 30, nut 26 is configured as an integral locking nut 26 having locking serrations 27 formed on the face thereof.

Referring now also to FIG. 2, bracket 30 is mounted to section 40 by means of a bolt and nut combination 42. Holes 24 in strut 12 is then aligned with slot 38 and bolt 28 is inserted therethrough and nut 26 is engaged to bolt 28. Prior to tightening nut 26, strut 12 is selectively positioned relative to bracket 30 to thereby impart the desired tensile forces against section 40 as will be discussed more fully hereinafter.

In the illustrated embodiment of FIG. 2, strut 12 is shown affixed to three different sections 40 of an overhead garage door fabricated from wood in combination with different hardware systems on the respective sections 40. The upper portion of FIG. 2 shows bracket 30 mounted to section 40 in conjunction with a hinge bracket 48. Hinge bracket 48 is bolted to section 40 at a bolt and nut 44 with bracket 30 bolted thereto with bolt and nut 42. Bolt and nut 42 substitutes for a second bolt and nut 44 by being used also to bolt bracket 30 to section 40. Correspondingly, hinge 47, shown in the middle portion of FIG. 2, is bolted to section 40 at three bolt and nuts 44 while one bolt and nut 42 secures bracket 30 to hinge 47 and section 40. An end plate 46, shown in the lower portion of FIG. 2, is bolted to section 40 by two bolt and nuts 44 while bolt and nut 42 secures bracket 30 to end plate 46 and section 40.

The purpose of the foregoing description of FIG. 2 is to illustrate that bracket 30 as well as strut 12 can be attached to section 40 in combination with any suitable hardware mounted to section 40. Further, the double duty performed by bolt and nut 42 eliminates the requirement for an additional bolt and nut 44. It is also important to note that strut 12 and bracket 30 can be inverted so as to readily conform with any particular hardware configuration on section 40.

Referring now more particularly to FIGS. 3 and 4, the curvature imparted to section 40, concave in FIG. 3 and convex in FIG. 4, is shown greatly exaggerated for purposes of illustration. The predetermined tension forces are illustrated schematically at arrow 50. These forces are applied to section 40 by the selective positioning of strut 12 relative to brackets 30. For example, the relative position between bracket 30*a* and the end of strut 12 can be selectively predetermined so as to either force the end of section 40 away from the end of bracket 12 as illustrated in FIG. 3 by tension arrow 50. Bolt 28*a* is then securely fastened to hold the relative position between bracket 30*a* and strut 12. Correspondingly, the interrelationship between strut 12 and brackets 30*b*–30*e* is selectively determined thereby imparting the necessary and desired tensile forces 50 between strut 12 and section 40. If it is desired to create the outwardly bowed or convex configuration of section 40 shown in FIG. 4, the end of strut 12 is secured to bracket 30*a* by bolt 28*a* at the desired interrelationship between strut 12 and bracket 30*a*. This is done by foreshortening the distance between strut 12 and section 40. The appropriate forces are exerted on section 40 by adjusting the relationship between brackets 30*b*–30*e* along the length of strut 12. The appropriate adjustments are made at brackets 30*b*–30*d* thereby forcing the corrective forces into section 40 relative to strut 12 as shown by arrows 50.

When strut 12 is mounted adjacent section 40 as shown at bracket 30*c* (FIG. 3) the end of bracket 30, leg 32 (FIG. 1), extends beyond the width of web 14. A conventional bracket having square corners (not shown) would expose these corners where they could cause accidental injury to an operator (not shown). However, the rounded configuration to leg 32 (FIG. 1) completely eliminates this hazard.

The width of web 14 can be selectively predetermined so as to impart the desired degree if stiffness to strut 12. Correspondingly, the relative lengths of brackets 30 can be coordinated with the width of web 14 so as to provide the appropriate support combination to section 40.

The Method

The novel method of this invention includes forming strut 12 from a sheet metal having the desired dimensions and materials specification so as to incorporate the desired degree of rigidity into strut 12. Web 14 along with side elements 16 and 18 impart rigidity to strut 12 in the axis transverse to the longitudinal axis of strut 12. Correspondingly, the materials of fabrication and the specifications of bracket 30 are also selectively predetermined so as to provide the necessary strength and rigidity to bracket 30. Slots 36 and 38 in bracket 30 as well as hole 24 in strut 12 are also selectively formed in the respective elements so as to selectively orient the alignment of brackets 30 on section 40 in relationship to the orientation of strut 12 to section 40. Brackets 30 are mounted along the inner face of section 40 by securely engaging the same with bolt and nut combination 42. Strut 12 is adjustably mounted to brackets 30 while preselectively adjusting the relative distance between strut 12 and section 40 at each bracket 30 to thereby impart the desired tension forces to section 40 by strut 12.

Strut 12 imparts a preselected degree of stiffness, support, and/or tension to section 40 thereby substantially improving the overall appearance and function of the section. Importantly, the tension forces imparted by strut 12 can be selectively predetermined by the installer (not shown). Strut 12 can be used to provide support to section 40 against the weight of section 40 as well as against wind loading forces. Strut 12 can also be used to straighten a warped section 40 or to create a predetermined degree of curvature (concave, FIG. 3, or convex, FIG. 4) in section 40. Any of the foregoing functions are accomplished by the selection of the specific relationship between strut 12 and brackets 30*a*–30*e* (FIGS. 3 and 4). Bolts 28*a*–28*e* provide the necessary secure engagement between strut 12 and brackets 30*a*–30*e* once the relative relationship has been selected.

Bolt 28 is obtained from a commercial source as a specially hardened steel to thereby enable bolt 28 to withstand the forces imposed thereon. This is an important feature since it improves safety and lowers the overall costs of both material and labor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for selectively applying transverse tension perpendicular to a plane of an elongated section of an overhead garage door, the section being oriented longitudinally in the plane of the overhead garage door comprising:

preparing a longitudinal strut with a predetermined stiffness in a lateral direction, said longitudinal strut having a length that generally conforms to the elongated section of the overhead garage door, the longitudinal strut being formed with a generally C-shaped cross section with a central web oriented perpendicular to the elongated section of the overhead garage door and first and second side elements extending perpendicularly from each edge of said web, said second side element including a hem formed in its edge;

obtaining a plurality of brackets for mounting the longitudinal strut to the section of the overhead door, each bracket having an L-shaped configuration with an upright leg having an axis and a foot extending perpendicularly from said leg, said leg including a longitudinal slot along a portion of the axis of said leg, said foot including an elongated slot transverse to the axis of said leg;

mounting the brackets at the preselected locations along the length of said section of the overhead garage door by passing a fastener through said elongated slot in said bracket while positioning said bracket relative to said section of the overhead garage door with said elongated slot; and selectively applying transverse tension perpendicular to the plane of the elongated section of the overhead garage door by adjustably securing said longitudinal strut to said brackets with preselected spacing between said strut and said section in the lateral direction.

2. The method defined in claim 1 wherein said obtaining step includes forming a rounded end on said leg.

3. The method defined in claim 1 wherein said adjustably securing step comprises selecting a hardened bolt and attaching said strut to said bracket with said hardened bolt.

* * * * *